United States Patent
Hassan (10) Patent No.: US 11,977,484 B2
(45) Date of Patent: May 7, 2024

(54) ADAPTING IN-MEMORY DATABASE IN HYBRID MEMORY SYSTEMS AND OPERATING SYSTEM INTERFACE

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 15/213,754

(22) Filed: Jul. 19, 2016

(65) Prior Publication Data

US 2018/0024754 A1   Jan. 25, 2018

(51) Int. Cl.
| | | |
|---|---|---|
| *G06F 12/00* | (2006.01) | |
| *G06F 12/08* | (2016.01) | |
| *G06F 12/109* | (2016.01) | |
| *G06F 13/00* | (2006.01) | |

(52) U.S. Cl.
CPC ............ *G06F 12/08* (2013.01); *G06F 12/109* (2013.01); *G06F 2212/1044* (2013.01); *G06F 2212/205* (2013.01); *G06F 2212/502* (2013.01); *G06F 2212/657* (2013.01)

(58) Field of Classification Search
CPC ..... G06F 3/0616; G06F 3/0631; G06F 3/0685
USPC .......................................................... 711/170
See application file for complete search history.

(56) References Cited

U.S. PATENT DOCUMENTS

| | | |
|---|---|---|
| 5,845,325 A | 12/1998 | Loo |
| 6,157,955 A | 12/2000 | Narad et al. |
| 6,195,731 B1 | 2/2001 | Bordaz et al. |
| 6,760,721 B1 | 7/2004 | Chasen |
| 6,952,664 B1 | 10/2005 | Lahiri et al. |
| 7,085,751 B2 | 8/2006 | Finlay et al. |
| 7,181,578 B1 | 2/2007 | Guha |
| 7,360,073 B1 | 4/2008 | Billstrom et al. |
| 7,434,002 B1 | 10/2008 | Zedlewski et al. |
| 7,624,381 B1 | 11/2009 | Czajkowski et al. |
| 7,765,200 B2 | 7/2010 | Kandil et al. |
| 7,774,556 B2 | 8/2010 | Karamcheti et al. |
| 7,840,397 B2 | 11/2010 | Chiou |
| 7,958,329 B2 | 6/2011 | Holt |
| 8,170,859 B1 | 5/2012 | Christensson et al. |

(Continued)

FOREIGN PATENT DOCUMENTS

WO   2016167824   10/2016

OTHER PUBLICATIONS

U.S. Appl. No. 14/704,461, filed May 5, 2015, Ahmad Hassan.

(Continued)

*Primary Examiner* — Sheng Jen Tsai
(74) *Attorney, Agent, or Firm* — Fish & Richardson P.C.

(57) ABSTRACT

Implementations of the present disclosure include methods, systems, and computer-readable storage mediums for determining a first cost and a second cost associated with a virtual memory page accessed during execution of an application, the first cost being associated with a first memory type, and the second cost being associated with a second memory type in a hybrid memory system, comparing the first cost and the second cost to provide a comparison result, determining a current location of the virtual memory page, the current location including one of the first memory type and the second memory type, and selectively migrating the virtual memory page from the current location based on the comparison result and the current location.

20 Claims, 6 Drawing Sheets

(56) References Cited

U.S. PATENT DOCUMENTS

| | | |
|---|---|---|
| 8,185,471 B1 | 5/2012 | Walker et al. |
| 8,214,191 B2 | 7/2012 | Ferren et al. |
| 8,230,395 B1 | 7/2012 | Koh et al. |
| 8,456,905 B2* | 6/2013 | Kasorla .............. G06F 12/0246 365/185.02 |
| 8,572,051 B1 | 10/2013 | Chen et al. |
| 8,862,588 B1 | 10/2014 | Gay |
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2 | 2/2015 | Gounares et al. |
| 9,043,530 B1 | 5/2015 | Sundaram et al. |
| 9,304,913 B2 | 4/2016 | Dong et al. |
| 9,348,539 B1* | 5/2016 | Saxena ............... G06F 3/0685 |
| 9,411,674 B2* | 8/2016 | Pattabiraman ....... G06F 1/3275 |
| 9,626,327 B2 | 4/2017 | Eilert et al. |
| 9,652,380 B2 | 5/2017 | Byun et al. |
| 9,672,158 B2* | 6/2017 | Karamcheti ....... G06F 12/1009 |
| 9,712,538 B1 | 7/2017 | Vincent et al. |
| 9,720,925 B1 | 8/2017 | Lawson |
| 9,720,967 B2 | 8/2017 | Lee et al. |
| 9,740,438 B2* | 8/2017 | Hassan ............... G06F 3/0685 |
| 9,841,914 B2 | 12/2017 | Hassan |
| 9,846,550 B2 | 12/2017 | Muralimanohar |
| 10,083,183 B2 | 9/2018 | Hassan |
| 10,698,732 B2 | 6/2020 | Hassan |
| 10,783,146 B2 | 9/2020 | Hassan |
| 2001/0027387 A1 | 10/2001 | Miyake et al. |
| 2003/0033431 A1 | 2/2003 | Shinomiya |
| 2003/0065648 A1 | 4/2003 | Driesch et al. |
| 2003/0065688 A1 | 4/2003 | Dageville et al. |
| 2004/0184340 A1 | 9/2004 | Dwarkadas |
| 2004/0193935 A1 | 9/2004 | Kato et al. |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2006/0218123 A1 | 9/2006 | Chowdhuri et al. |
| 2006/0218125 A1 | 9/2006 | Kandil et al. |
| 2007/0050328 A1 | 3/2007 | Li |
| 2007/0050609 A1 | 3/2007 | Ferren et al. |
| 2007/0162425 A1 | 7/2007 | Betawadkar et al. |
| 2007/0202473 A1 | 8/2007 | Koda |
| 2007/0226186 A1 | 9/2007 | Ewen et al. |
| 2008/0005476 A1 | 1/2008 | Venkatesan |
| 2008/0034179 A1 | 2/2008 | Mewhinney et al. |
| 2008/0109592 A1* | 5/2008 | Karamcheti ............ G06F 12/10 711/E12.008 |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0024568 A1 | 1/2009 | Al-Omari et al. |
| 2009/0049234 A1 | 2/2009 | Oh et al. |
| 2009/0157952 A1 | 6/2009 | Kim et al. |
| 2009/0157964 A1* | 6/2009 | Kasorla .............. G06F 12/0246 711/118 |
| 2009/0182976 A1 | 7/2009 | Agesen et al. |
| 2009/0307462 A1 | 12/2009 | Fleming et al. |
| 2010/0010799 A1 | 1/2010 | Altrichter |
| 2010/0023800 A1 | 1/2010 | Harari et al. |
| 2010/0042999 A1 | 2/2010 | Dorai et al. |
| 2010/0153631 A1 | 6/2010 | Moon et al. |
| 2010/0169602 A1 | 7/2010 | Hulbert et al. |
| 2010/0262633 A1 | 10/2010 | Bhattacharjee et al. |
| 2010/0287356 A1 | 11/2010 | Cameron et al. |
| 2010/0306591 A1 | 12/2010 | Krishna |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1 | 4/2011 | Roberts et al. |
| 2011/0131199 A1 | 6/2011 | Simon et al. |
| 2011/0145221 A1 | 6/2011 | Kim et al. |
| 2011/0271264 A1 | 11/2011 | Vorbach et al. |
| 2011/0289126 A1 | 11/2011 | Aikas et al. |
| 2011/0313999 A1 | 12/2011 | Bruno et al. |
| 2012/0072744 A1* | 3/2012 | Jain ...................... G06F 1/3268 713/320 |
| 2012/0089595 A1 | 4/2012 | Jaecksch |
| 2012/0089803 A1 | 4/2012 | Dice |
| 2012/0124318 A1 | 5/2012 | Bivens |
| 2012/0144092 A1* | 6/2012 | Hsieh .................... G06F 12/023 711/103 |
| 2012/0151127 A1* | 6/2012 | Lim ..................... G06F 12/0246 711/103 |
| 2012/0151252 A1 | 6/2012 | Harris et al. |
| 2012/0158799 A1 | 6/2012 | Morsi et al. |
| 2012/0246392 A1 | 9/2012 | Cheon |
| 2012/0290768 A1 | 11/2012 | Rubowitz et al. |
| 2013/0013860 A1 | 1/2013 | Franceschini |
| 2013/0074092 A1 | 3/2013 | Gounares et al. |
| 2013/0080621 A1* | 3/2013 | Jain ...................... G06F 9/5094 709/224 |
| 2013/0081005 A1 | 3/2013 | Gounares et al. |
| 2013/0086309 A1* | 4/2013 | Lee ..................... G06F 12/0246 711/103 |
| 2013/0103380 A1 | 4/2013 | Brandstatter et al. |
| 2013/0226903 A1 | 8/2013 | Wu et al. |
| 2013/0246698 A1 | 9/2013 | Estan |
| 2013/0275716 A1 | 10/2013 | Nishida |
| 2013/0283250 A1 | 10/2013 | Eichenberger |
| 2013/0326109 A1 | 12/2013 | Kivity |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0189204 A1 | 7/2014 | Sugimoto et al. |
| 2014/0258266 A1 | 9/2014 | Craunes et al. |
| 2014/0280685 A1* | 9/2014 | Magenheimer ..... H04L 67/1097 709/213 |
| 2014/0281212 A1 | 9/2014 | Schreter et al. |
| 2014/0281249 A1 | 9/2014 | Waldsperger |
| 2014/0282455 A1 | 9/2014 | Felch |
| 2014/0293801 A1 | 10/2014 | Dimon |
| 2014/0310462 A1 | 10/2014 | Waldspurger et al. |
| 2014/0351411 A1 | 11/2014 | Woods et al. |
| 2014/0372428 A1 | 12/2014 | Mathis et al. |
| 2015/0012465 A1 | 1/2015 | Pingenot |
| 2015/0062736 A1 | 3/2015 | Kim et al. |
| 2015/0077426 A1 | 3/2015 | Kweon et al. |
| 2015/0081300 A1 | 3/2015 | Kim |
| 2015/0089604 A1 | 3/2015 | Mathew |
| 2015/0106582 A1 | 4/2015 | Mai et al. |
| 2015/0154087 A1 | 6/2015 | Jin et al. |
| 2015/0169226 A1 | 6/2015 | Shen et al. |
| 2015/0199126 A1* | 7/2015 | Jayasena ............... G11C 11/005 711/103 |
| 2015/0206574 A1* | 7/2015 | Greathouse ........ G11C 14/0018 711/103 |
| 2015/0261818 A1 | 9/2015 | Attaluri et al. |
| 2015/0309789 A1 | 10/2015 | Thorat |
| 2015/0363319 A1 | 12/2015 | Qi |
| 2015/0370560 A1 | 12/2015 | Tan |
| 2016/0005423 A1 | 1/2016 | Neppalli et al. |
| 2016/0019132 A1 | 1/2016 | Vilakkunnadathil |
| 2016/0117241 A1 | 4/2016 | Shah et al. |
| 2016/0117258 A1 | 4/2016 | Karamcheti et al. |
| 2016/0125927 A1* | 5/2016 | Wei ......................... G11C 11/16 365/148 |
| 2016/0150003 A1 | 5/2016 | Magdon-Ismall |
| 2016/0179685 A1 | 6/2016 | Byun et al. |
| 2016/0188217 A1 | 6/2016 | Golander et al. |
| 2016/0196112 A1 | 7/2016 | Edwards et al. |
| 2016/0196324 A1 | 7/2016 | Haviv et al. |
| 2016/0205174 A1 | 8/2016 | Pitio et al. |
| 2016/0253093 A1* | 9/2016 | Zhang ..................... G06F 12/08 |
| 2016/0283393 A1 | 9/2016 | Kawaba |
| 2016/0321048 A1 | 11/2016 | Matsuura |
| 2016/0328169 A1* | 11/2016 | Hassan ................. G06F 3/0625 |
| 2016/0336069 A1* | 11/2016 | Lin ..................... G11C 11/5657 |
| 2016/0378169 A1* | 12/2016 | Naeimi .................. G06F 1/3275 713/323 |

(56) References Cited

U.S. PATENT DOCUMENTS

| | | | |
|---|---|---|---|
| 2016/0378829 | A1 | 12/2016 | Vengerov et al. |
| 2016/0378977 | A1 | 12/2016 | Alme et al. |
| 2017/0010817 | A1* | 1/2017 | Lim .................. G06F 3/0604 |
| 2017/0010952 | A1 | 1/2017 | Nandakumar et al. |
| 2017/0052741 | A1* | 2/2017 | Hassan .............. G06F 3/0685 |
| 2017/0052742 | A1 | 2/2017 | Hassan |
| 2017/0060740 | A1* | 3/2017 | Doerner .............. G06F 12/121 |
| 2017/0090776 | A1 | 3/2017 | Kowles |
| 2017/0091334 | A1 | 3/2017 | Kabiljo et al. |
| 2017/0115892 | A1* | 4/2017 | Gokita .............. G06F 12/0868 |
| 2017/0116210 | A1 | 4/2017 | Park et al. |
| 2017/0147516 | A1 | 5/2017 | De |
| 2017/0154136 | A1 | 6/2017 | Eckmann et al. |
| 2017/0160955 | A1* | 6/2017 | Jayasena .............. G06F 3/0613 |
| 2017/0161198 | A1 | 6/2017 | Trika |
| 2017/0193136 | A1 | 7/2017 | Prasad et al. |
| 2017/0206010 | A1 | 7/2017 | Nachimuthu |
| 2017/0206172 | A1 | 7/2017 | Ma |
| 2017/0212843 | A1 | 7/2017 | Agesen et al. |
| 2017/0220256 | A1* | 8/2017 | Balasubramonian ... G06F 3/061 711/103 |
| 2017/0220257 | A1* | 8/2017 | Balasubramonian ... G06F 3/061 710/313 |
| 2017/0220488 | A1* | 8/2017 | Balasubramonian ........ G06F 12/128 711/114 |
| 2017/0220516 | A1 | 8/2017 | Eilert et al. |
| 2017/0223046 | A1 | 8/2017 | Singh |
| 2017/0242595 | A1* | 8/2017 | Niu .................. G06F 3/0613 |
| 2017/0255674 | A1 | 9/2017 | Attaluri et al. |
| 2017/0289000 | A1 | 10/2017 | Parks et al. |
| 2017/0301386 | A1 | 10/2017 | Parks et al. |
| 2017/0352012 | A1 | 12/2017 | Hearn et al. |
| 2018/0024750 | A1 | 1/2018 | Hassan |
| 2018/0024755 | A1 | 1/2018 | Hassan |
| 2018/0024821 | A1 | 1/2018 | Hassan |
| 2018/0024913 | A1 | 1/2018 | Hassan |
| 2018/0024922 | A1 | 1/2018 | Hassan |
| 2018/0024923 | A1 | 1/2018 | Hassan |
| 2018/0024928 | A1 | 1/2018 | Hassan |
| 2018/0024997 | A1 | 1/2018 | Hassan |
| 2018/0025016 | A1 | 1/2018 | Hassan |
| 2018/0025055 | A1 | 1/2018 | Hassan |
| 2018/0025904 | A1 | 1/2018 | Hassan |
| 2018/0357001 | A1* | 12/2018 | Scheer .................. G06F 12/02 |
| 2019/0057131 | A1 | 2/2019 | Hassan |

OTHER PUBLICATIONS

U.S. Appl. No. 14/831,567, filed Aug. 20, 2015, Ahmad Hassan.
U.S. Appl. No. 14/831,624, filed Aug. 20, 2015, Ahmad Hassan.
U.S. Appl. No. 15/677,700, filed Aug. 15, 2017, Hassan.
Dhiman et al., "PDRAM A hybrid PRAM and DRAM main memory system," Proceedings of the 46th Annual Design Automation Conference, Jul. 26-31, 2009, pp. 664-669.
Hassan et al., "Analytical models and techniques for Software-Managed Energy-Efficient Hybrid DRAM/NVM Main Memory," AMC International Conference on Computing Frontiers 2015, May 18-21, 2015.
Hassan et al., "Energy-Efficient In-Memory Data Stores on Hybrid Memory Hierarchies," Eleventh International Workshop on Dada Management on New Hardware, Jun. 2015, last retrieved from https//event.cwi.nl/damon2015/slides/slides-hassan.pdf on Jan. 5, 2018.
Hu et al., "Data allocation optimization for hybrid scratch pad memory with sram and nonvolatile memory," IEEE Transactions on Very Large Scale Integration (VLSI) Systems, Jun. 2013, 21(6) 1094-1102.
Li et al., "Assert(!Defined(Sequential I/O))," Proceedings of the 6th USENIX Conference on Hot Topics in Storage and File Systems, Jun. 17-18, 2014, 1-5.
Luk et al., "Pin Building Customized Program Analysis Tools with Dynamic Instrumentation," ACM Sigplan Notices, Jun. 2005, 40(6) 190-200.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 20, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jan. 11, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
Wang et al., "Optimizated Allocation of Data Variables to PCM/DRAM-based Hybrid Main Memory for Real-Time Embedded Systems," Embedded Systems Letters, IEEE, Sep. 2014, 6(3) 61-64.
U.S. Office Action in related U.S. Appl. No. 15/213,816 dated Feb. 7, 2019, 33 pages.
U.S. Office Action in related U.S. Appl. No. 15/214,102 dated Feb. 6, 2019, 41 pages.
U.S. Office Action in U.S. Appl. No. 15/213,930 dated Feb. 26, 2019, 35 pages.
Final Office Action issued in U.S. Appl. No. 15/214,082 dated Mar. 8, 2019, 41 pages.
Final Office Action issued in U.S. Appl. No. 15/213,626 on Oct. 18, 2019, 41 pages.
Final Office Action issued in U.S. Appl. No. 15/213,654 on Jul. 18, 2019, 21 pages.
Final Office Action issued in U.S. Appl. No. 15/213,674 on Oct. 18, 2019, 43 pages.
Final Office Action issued in U.S. Appl. No. 15/213,816 on Jan. 2, 2020, 43 pages.
Final Office Action issued in U.S. Appl. No. 15/214,082 on Mar. 19, 2020, 38 pages.
Final Office Action issued in U.S. Appl. No. 15/677,700 on May 28, 2020, 26 pages.
Final Office Action issued in U.S. Appl. No. 15/213,626 on Dec. 24, 2020, 37 pages.
Non-Final Office Action issued in U.S. Appl. No. 15/213,626 on Apr. 12, 2019, 23 pages.

(56) References Cited

OTHER PUBLICATIONS

Non-Final Office Action issued in U.S. Appl. No. 15/213,626 on Jun. 9, 2020, 45 pages.
Non-Final Office Action issued in U.S. Appl. No. 15/213,674 on Jan. 30, 2020, 38 pages.
Non-Final Office Action issued in U.S. Appl. No. 15/213,674 on Apr. 12, 2019, 27 pages.
Non-Final Office Action issued in U.S. Appl. No. 15/213,816 on Jun. 18, 2019, 46 pages.
Non-Final Office Action issued in U.S. Appl. No. 15/214,082 on Sep. 6, 2019, 36 pages.
Non-Final Office Action issued in U.S. Appl. No. 15/677,700 on Dec. 16, 2020, 23 pages.
Non-Final Office Action issued in U.S. Appl. No. 15/677,700 on Nov. 18, 2019, 60 pages.
Chen et al., "FSRAM: Flexible Sequential and Random Access Memory for Embedded Systems" Laboratory for Advanced Research in Computing Technology and Compilers Technical Report No. ARCTiC, Mar. 1, 2004, 6 pages.
Dulloor et al., "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menncached over High Performance Networks" 2012 $41^{st}$ International Conference on Parallel Processing, IEEE, Sep. 10, 2012, 10 pages.
Wang et al., "NVMalloc: Exposing an Aggregate SSD Store as a Memory Partition in Extreme-Scale Machines" 2012 IEEE $26^{th}$ International Parallel and Distributed Processing Symposium, May 21, 2012, 12 pages.
Zakai, "Emscripten: An LL VM-to-JavaScript Compiler," Proceedings of the ACM international conference companion on Object oriented programming systems languages and applications companion (OOPSLA), Portland, Oregon, Oct. 22-27, 2011, 12 pages.

* cited by examiner

ADAPTING IN-MEMORY DATABASE IN HYBRID MEMORY SYSTEMS AND OPERATING SYSTEM INTERFACE

BACKGROUND

Enterprises, such as business enterprises, operate enterprise systems to provide software functionality to customers and employees. In some examples, an enterprise system can include back-end enterprise servers that host enterprise applications. Example enterprise applications include enterprise resource planning (ERP) systems, client-relationship management (CRM) systems, product lifecycle management (PLM) systems, supply chain management (SCM) systems, and supplier relationship management (SRM) systems. During operation of an enterprise application, application data is accessed, which is stored in main memory of the enterprise server. In this manner, the application data is immediately accessible by processors of the enterprise server.

Increasingly large amounts of application data are stored in the main memory of enterprise servers. Main memory can include dynamic random access memory (DRAM), which consumes a relatively high amount of static energy (both in active and idle states) due to continuous leakage and refresh power. Non-volatile memory (NVM), also referred to as storage class memory (SCM) (e.g., phase change memory (PCM)) can address fundamental limitations of DRAM. Characteristics that differentiate NVM from DRAM include data persistence, high latency, high write energy, low static energy and low write endurance (e.g., wear-out of cells). Physically, NVM is inserted into a memory bus along with DRAM.

SUMMARY

Implementations of the present disclosure include computer-implemented methods for placement of data in differing memory types of hybrid memory systems. In some implementations, methods include actions of determining a first cost and a second cost associated with a virtual memory page accessed during execution of an application, the first cost being associated with a first memory type, and the second cost being associated with a second memory type in a hybrid memory system, comparing the first cost and the second cost to provide a comparison result, determining a current location of the virtual memory page, the current location including one of the first memory type and the second memory type, and selectively migrating the virtual memory page from the current location based on the comparison result and the current location.

These and other implementations can each optionally include one or more of the following features: each of the first cost and the second cost is determined based on a read energy and a write energy expended for the virtual memory page with the respect to the first memory type and the second memory type, respectively; selectively migrating the virtual memory page including migrating the virtual memory page from the second memory type to the first memory type in response to determining that the second cost exceeds the first cost, and that the virtual memory page is stored in the second memory type; selectively migrating the virtual memory page includes migrating the virtual memory page from the first memory type to the second memory type in response to determining that the second cost does not exceed the first cost, and that the virtual memory page is stored in the first memory type; migrating the virtual memory page includes copying the virtual memory page from one of the first memory type and the second memory type to the other of the first memory type and the second memory type, and deleting the virtual memory page from the one of the first memory type and the second memory type; determining the first cost and the second cost is performed in response to the virtual memory page being accessed; and the first memory type includes dynamic random access memory (DRAM), and the second memory type comprises non-volatile memory (NVM).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to placement of data in differing memory types of hybrid memory systems. In some implementations, actions can include determining a first cost and a second cost associated with a virtual memory page accessed during execution of an application, the first cost being associated with a first memory type, and the second cost being associated with a second memory type in a hybrid memory system, comparing the first cost and the second cost to provide a comparison result, determining a current location of the virtual memory page, the current location including one of the first memory type and the second memory type, and selectively migrating the virtual memory page from the current location based on the comparison result and the current location.

To provide context for implementations of the present disclosure, the requirement for main memory capacity in data centers has increased significantly in the last decade. Consequently, the energy consumed by the data centers has correspondingly increased. For example, from 2005 to 2010, the worldwide energy consumption in data centers has increased by approximately 50%. As one example, electricity consumption in European data centers was approximately 56 TWh per year, and is projected to increase up to approximately 104 TWh per year by 2020. However, studies have shown that average server utilization in a data center ranges from 20-30%, for example. Further studies have revealed that main memory (DRAM) accounts for 30% of the total power consumed in a data center. Several studies have proposed techniques to minimize power consumption in DRAM, however, the problem is more fundamental. For example, because DRAM is volatile, it requires continuous static power (e.g., leakage power, refresh power).

DRAM scaling has been used to address management of application data in main memory of enterprise servers. However, there are limits to DRAM scaling. For example, the scaling of DRAM to below 40 nm is questionable. As there are limits to DRAM scaling, storage class memory (SCM), such as byte-addressable non-volatile memory (NVM) (e.g., phase change memory (PCM)), is considered for use in main memory replacement.

NVM is an emerging category of memories that offer non-volatility, byte-addressability, high density, energy efficiency, and low cost. For example, NVM provides byte-addressability like DRAM, and persistence like hard disks drives (HDDs). The scaling property and energy efficiency of NVMs, such as PCM, has become popular in research communities. NVM provides low cost and low energy alternatives to DRAM, and also offers core features like persistence and high scalability. In some examples, studies on conventional DRAM have shown that the leakage energy is a significant portion of the total power consumed by DRAM, and should be a primary focus of energy conservation approaches. Unlike DRAM, SCM requires extremely low leakage power and no refresh power, and the scaling property of SCM is promising (e.g., unlike DRAM, PCM can scale down to approximately 10 nm). NVM, however, has certain disadvantages, which can vary between NVM technologies. Generally, disadvantages of NVM include increased latency and dynamic energy for NVM accesses, and reduced memory bandwidth and a fast wear-out of NVM devices as compared to DRAM.

Hybrid main memory, including multiple types of memory (e.g., DRAM, NVM), is implemented to address the advantages and disadvantages of DRAM and NVM. The concept behind hybrid main memory is that a small amount of DRAM holds frequently accessed data (hot data) and provides low latency and low dynamic energy, while a large amount of NVM is used to implement a scalable memory system and store the majority of less frequently accessed data (cold data).

As introduced above, implementations of the present disclosure provide an end-to-end approach to allocate data from an application by using memory allocators. Implementations of the present disclosure provide an interface between the application and an OS, and maps pages (virtual memory pages) to underlying physical memory devices. In some implementations, an NVM allocator is provided as a default allocator for a hybrid memory system, and allocations identified as critical allocations are conducted using a DRAM allocator.

Implementations of the present disclosure further provide data management policies at the granularity of application objects and virtual memory pages (pages). In some implementations, application knowledge and behavior are used to derive best initial placement for an application object at allocation time. In some examples, after the initial allocation, pages can be moved between DRAM and NVM in the hybrid memory system in order to adapt to dynamic workload characteristics. Accordingly, implementations of the present disclosure combine the static, initial page placement with a dynamic page placement. In this manner, implementations of the present disclosure conserve energy in hybrid memory systems.

Figure 1:
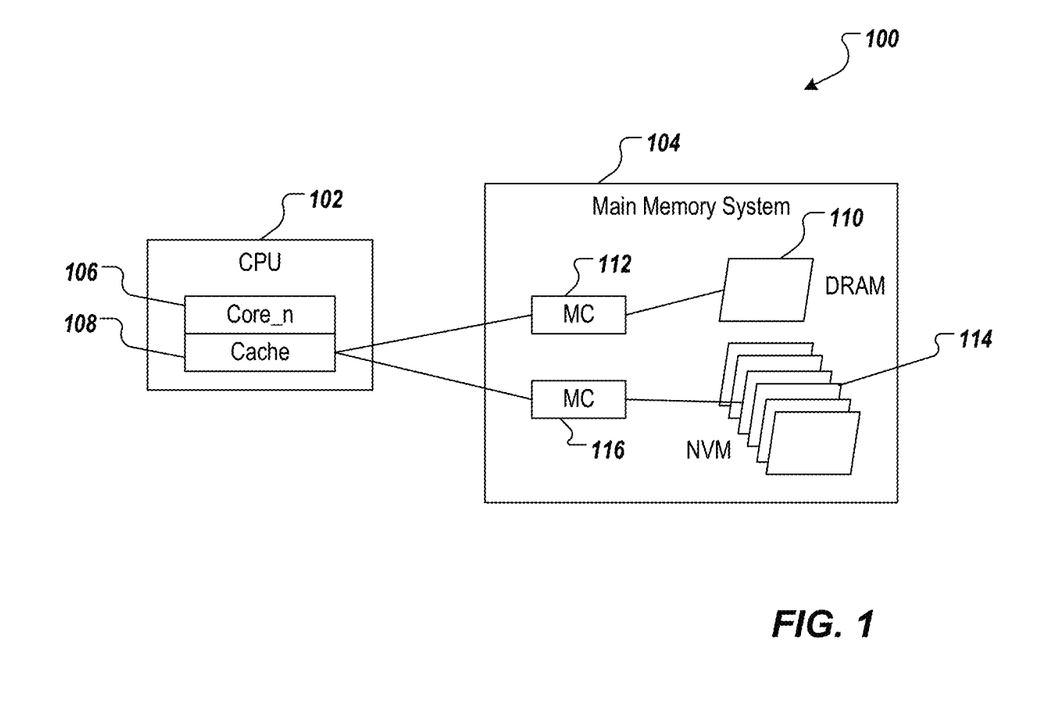
FIG. 1 depicts an example hybrid main memory architecture in accordance with implementations of the present disclosure.

FIG. 1 depicts an example memory architecture 100 that can be implemented within an enterprise server. In the example of FIG. 1, the example memory architecture 100 includes a central processing unit (CPU) 102 and a main memory system 104. The CPU 102 includes a core 106 having a respective cache 108. Although a single core and respective cache 108 is depicted, it is appreciated that the CPU 102 can include multiple cores, each with a respective cache. Further, although a single CPU 102 is depicted, it is appreciated that enterprise servers can include multiple CPUs. The main memory system 104 includes DRAM 110 with a respective memory controller (MC) 112, and NVM 114 with a respective MC 116. In some examples, the cache 108 accesses (e.g., read, write, delete) the DRAM 110 through the MC 112, and accesses (e.g., read, write, delete) the NVM 114 through the MC 114.

In some examples, the example memory architecture 100 can be implemented in an in-memory database system. In some examples, an in-memory database system is a database management system that uses main memory for data storage. In some examples, main memory includes random access memory (RAM) that communicates with one or more processors (e.g., central processing units (CPUs)), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

As introduced above, implementations of the present disclosure provide a programming interface (not depicted in FIG. 1) that exposes the hybrid nature of the main memory system 104 to application programmers. At the hardware level, the DRAM 110 and NVM 114 (e.g., memory chips) are assigned distinct physical address regions. This corresponds to how the basic input/output system (BIOS) reports dual in-line memory module (DIMMs) and their physical address ranges to the OS. In this case, the BIOS also reports the technology used to implement the DIMMs. The OS can select to allocate virtual memory pages on either type of memory (e.g., DRAM, NVM), depending on requirements set by the programmer.

Figure 2:
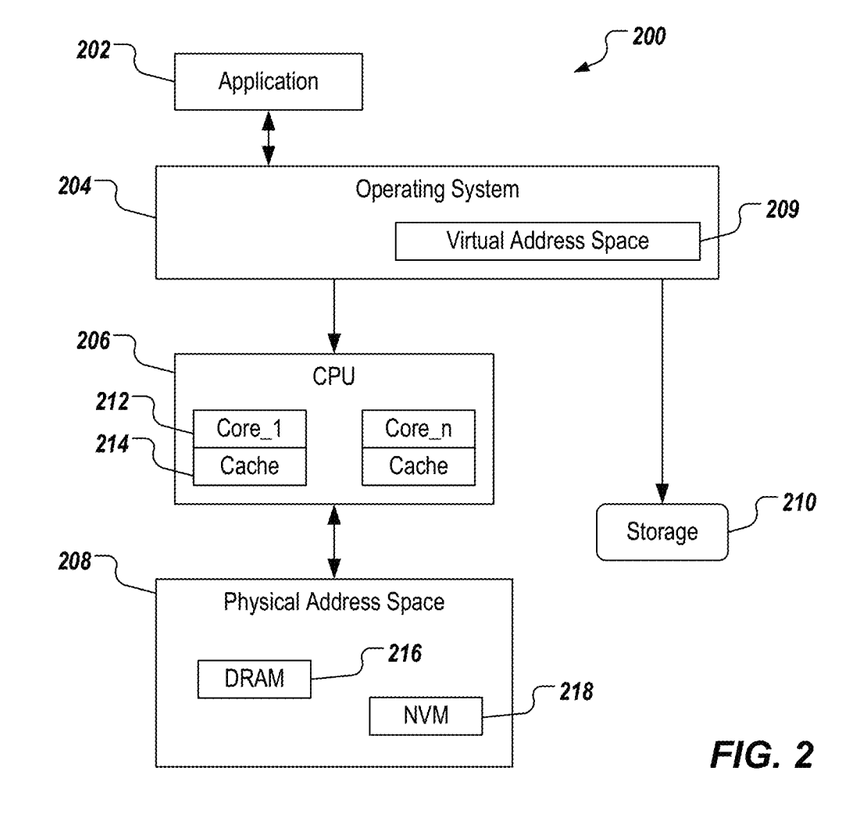
FIG. 2 depicts an example architecture in accordance with implementations of the present disclosure.

FIG. 2 depicts an example architecture 200 for storing data in accordance with implementations of the present disclosure. In the depicted example, the example architecture 200 includes an application 202, an OS 204, a CPU 206, a physical address space 208, a virtual address space 209, and storage 210. In some examples, execution of the application 202 is coordinated by the OS 204. The CPU 206 includes a plurality of cores 212 (Core_1, . . . , Core_n) with respective caches 214 (e.g., last-level cache (LLC)). In some examples, the CPU 206 coordinates read/write access to the physical address space 208, which is provided as a hybrid main memory (e.g., the main memory system 104 of FIG. 1), described herein. Accordingly, the physical address space 208 includes DRAM 216 and NVM 218 (e.g., for storing hot objects and cold objects, respectively).

In some examples, the application 202 is the application, for which data allocations between the DRAM 216 and NVM 218 are to be made. In some examples, the virtual address space 209 is provided as a set of binary addresses that is used by the operating system 204 to allocate memory addresses to any process requesting the memory. In some examples, the virtual address space 209 enables the processes to use more memory addresses than the actual DRAM memory available in the system. In some implementations, the operating system 204 manages the mappings between virtual addresses and physical addresses. In some examples, the storage 210 is provided as hard disk drive that is used for permanent storage of data.

In accordance with implementations of the present disclosure, the OS enables the application programmer to decide whether data should be allocated on NVM or on DRAM. In some examples, the mechanism to create new virtual memory pages is through a mmap system call. Implementations of the present disclosure enables the flag argument mmap to indicate whether the new pages should be mapped to DRAM or NVM. In some implementations, mapping to NVM is provided as a default. That is, the OS maps the pages to NVM, unless it is otherwise determined to map the pages to DRAM. In some examples, and if the pages are to be mapped to DRAM, the OS records the target memory request and allocates the physical page on DRAM, if space is available. If space is not available, the physical page is allocated on NVM.

In some examples, applications use finer-grain mechanisms for memory allocation, such as the malloc family of functions. The malloc functions manage a set of virtual memory pages obtained through mmap, and allocate objects from these pages. In order to differentiate between DRAM and NVM allocations, implementations of the present disclosure provide distinct memory allocators in the application, one managing pages mapped to DRAM, and the other managing pages mapped to NVM. In some examples, each memory allocator provides standard memory allocation functions prefixed with either "dram_" (e.g., dram_malloc) or "nvm_" (e.g., nvm_malloc). In some examples, the standard function names are retained and are mapped to the NVM allocator. In some implementations, only dynamically allocated memory is allocated through mmap or malloc, and it can be assumed that static variables and stack variables are always mapped to NVM.

In some implementations, a migration process is provided to migrate data between types of memory (e.g., moving objects between NVM and DRAM). In some examples, if migration is to be performed, the programmer can allocate a new copy of the object on the opposing memory type and copy the data to the opposing memory type. For example, if an object is to be migrated from NVM to DRAM, a new copy of the object can be allocated on DRAM, and the data of the object can be copied to DRAM. In some implementations, migrations coincide with existing memory copying code. For example, this occurs as migrations are performed only when data set sizes grow to exceed the last level cache (LLC) capacity. Because data set sizes are hard to predict in advance, data is stored in incrementally growing buffers. Growing these buffers involves allocating a new, larger buffer, and copying the data over. Implementations of the present disclosure leverage existing copies to avoid additional migration cost.

Figure 3:
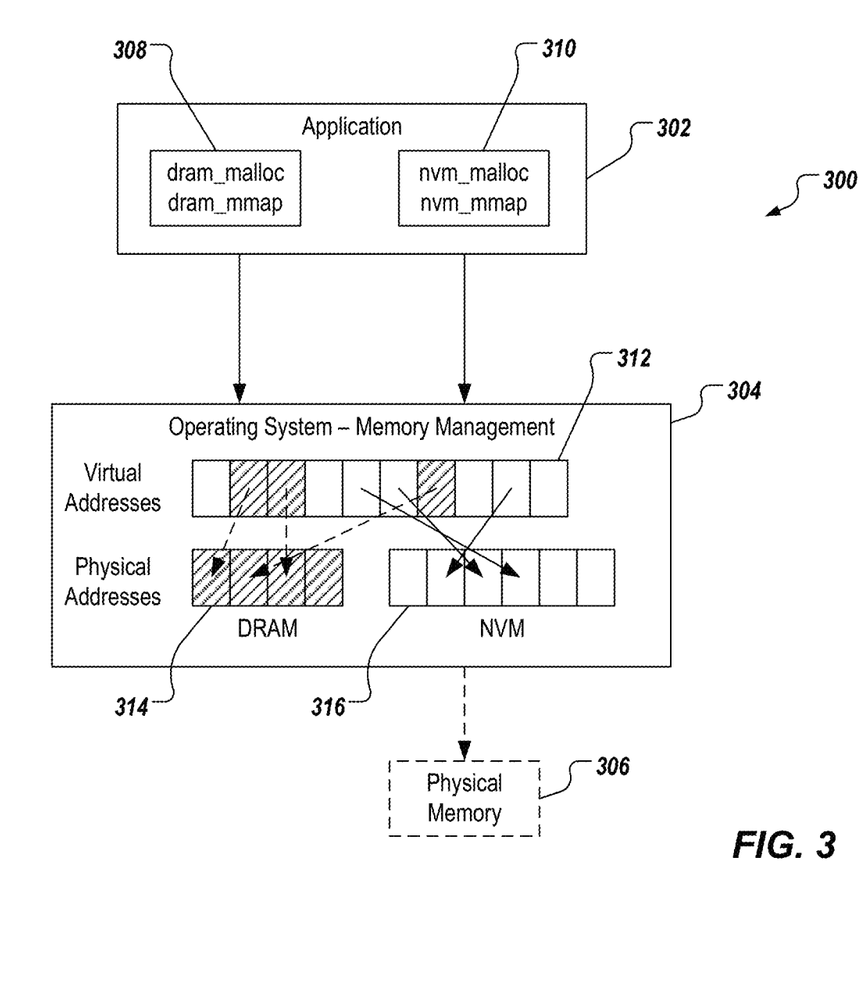
FIG. 3 depicts an example architecture in accordance with implementations of the present disclosure.

FIG. 3 depicts an example architecture 300 in accordance with implementations of the present disclosure. The example architecture 300 includes an application 302, an OS 304, and physical memory 306. In some examples, the application 302 is the application, for which a developer is to define memory allocations to particular types of memory in accordance with implementations of the present disclosure. More particularly, the application 302 includes DRAM allocators 308, and NVM allocators 310. The OS 304 includes virtual addresses 312. In some examples, the physical memory 306 includes a plurality of memory devices 314, 316. In some examples, each memory device 314, 316 is of a respective type (e.g., DRAM, NVM).

FIG. 3 depicts the interface between the application 302 and the OS 304, and between the OS 304 to the physical memory 306 in accordance with implementations of the present disclosure. In the depicted example, there are four memory allocators at the application level. More particularly, the DRAM allocators 308 include dram_malloc and dram_mmap, which are used for allocating data on DRAM, and the NVM allocators 310 include nvm_malloc and nvm_mmap, which are used for allocating data on NVM. In accordance with implementations of the present disclosure, the default allocation is on NVM, and is performed using nvm_malloc and nvm_mmap.

In some implementations, an object, and an allocation thereof, can be identified as critical, as described in further detail herein. For example, an object can be determined to be critical if accesses to main memory for the object exceed a threshold number of access. It has been determined that a significant number (e.g., more than 98%) of allocations are not critical. In accordance with implementations of the present disclosure, non-critical allocations use the default allocators (e.g., nvm_malloc, nvm_mmap). In some examples, non-critical allocations either have few accesses to main memory, or have good cache locality, such that most of their accesses are served from the caches.

Implementations of the present disclosure have been implemented in MonetDB (an open source column-oriented database management system), and it was found that there are approximately 3250 call sites in MonetDB for dynamic allocation using malloc and mmap. In accordance with implementations of the present disclosure, the default is to use NVM. It was determined that there are only 7 call sites in MonetDB, where a decision was to be made as to whether an allocation goes to DRAM or NVM. As such, adapting known database systems to run in hybrid memory requires minimal code changes.

In order to analyze the most critical objects in terms of main memory accesses, implementations of the present disclosure use cost models for performance and energy. In some examples, an object is an individual program variable and memory allocation within the application code. In some implementations, the cost model for performance takes into account only access latency. Bandwidth issues can occur when objects are frequently accessed, in which case it has already been determined to place the object on DRAM due to the latency benefits (e.g., NVM has slower access than DRAM).

In some implementations, the performance cost of an object o is provided as the average memory access time (AMAT) incurred by memory accesses to the object o stored in a memory of technology τ, which can be determined based on the following example relationship:

$$AMAT_\tau(o) = \mu_r(o)L_{\tau,r} + \mu_w(o)L_{\tau,w} + (1-\mu_r(o))L_{LLC} \quad (1)$$

where τ is either DRAM or NVM, $L_{\tau,r}$ is the latency to read a cache block in memory, $L_{\tau,w}$ is the latency to write a cache block in memory, $L_{LLC}$ is the latency to access the LLC, $\mu_r(o)$ is the number of read memory accesses made to o per load or store operation, and $\mu_w(o)$ is the number of write memory accesses made for o normalized per load or store operation. The example relationship (1) addresses a single-level cache, but can be extended to address multi-level caches. In some examples, for read accesses, $\mu_r(o)$ is set equal to the global cache miss rate for the LLC (e.g., the number of LLC misses divided by the number of load or store operations). Accordingly, $L_{\tau,r}$ corresponds to the average read latency for a cache block. In the case of write accesses, $\mu_w(o)$ is a measure of write-back traffic, and $L_{\tau,w}$ corresponds to the average write latency.

Besides estimating performance, implementations of the present disclosure estimate the energy impact of storing an object over its lifetime. In some examples, static energy is considered, which is always present throughout the lifetime of an object and includes leakage and refresh energy, and dynamic energy, which is proportional to the frequency of memory accesses. Average memory access energy (AMAE) can be determined based on the following example relationship:

$$AMAE_\tau(o) = \mu_r(o)E_{\tau,r} + \mu_w(o)E_{\tau,w} + S(o)P_\tau T(o) \quad (2)$$

where, $E_{\tau,r}$ and $E_{\tau,w}$ are the energy for reading and writing, respectively, a cache block to or from memory type τ, the parameters $\mu_r(o)$ and $\mu_w(o)$ represent the read access and write accesses to memory, respectively, as in the definition of AMAT, $P_\tau$ is the average leakage power per byte for memory type τ, and the parameters S(o) and T(o) represent the size and lifetime, respectively, of the object o normalized per load or store operations.

In accordance with implementations of the present disclosure, for static placement of objects, objects are placed in memory, such that energy is minimized and latency is raised by no more than a fixed percentage (λ) over a DRAM-only system (e.g., λ=5%). To this end, the objects are sorted in order of increasing performance difference (ΔAMAT(o)), and objects are placed on DRAM in this order until DRAM is full. In some examples, the performance difference is determined based on the following example relationship:

$$\Delta AMAT(o) = AMAT_{DRAM}(o) - AMAT_{NVM}(o) \quad (3)$$

which provides an estimation of the potential slowdown by placing the object on NVM. Further, an AMAE delta is determined based on the following relationship:

$$\Delta AMAE(o) = AMAE_{DRAM}(o) - AMAE_{NVM}(o) \quad (4)$$

which provides an estimation of the energy gain by placing the object on NVM. The latter is typically a function of the trade-off between static and dynamic energy for the object.

In some implementations, the list of sorted objects ($o_i$, 1≤i≤N) is partitioned by splitting the list at an index s, such that objects $o_i$, i≤s are placed on DRAM, and objects $o_i$, i>s are placed on NVM. In some examples, the index s is selected, such that the expected overall slowdown should be comparable to the DRAM-only memory system.

In accordance with implementations of the present disclosure, the performance model (AMAT) and energy model (AMAE) are used for static data placement, and dynamic data placement. More particularly, and as described in further detail herein, static data placement is performed to place an object on DRAM or NVM at the start of the application. During execution of the application, dynamic data placement is performed to selectively migrate data between DRAM and NVM.

Figure 4:
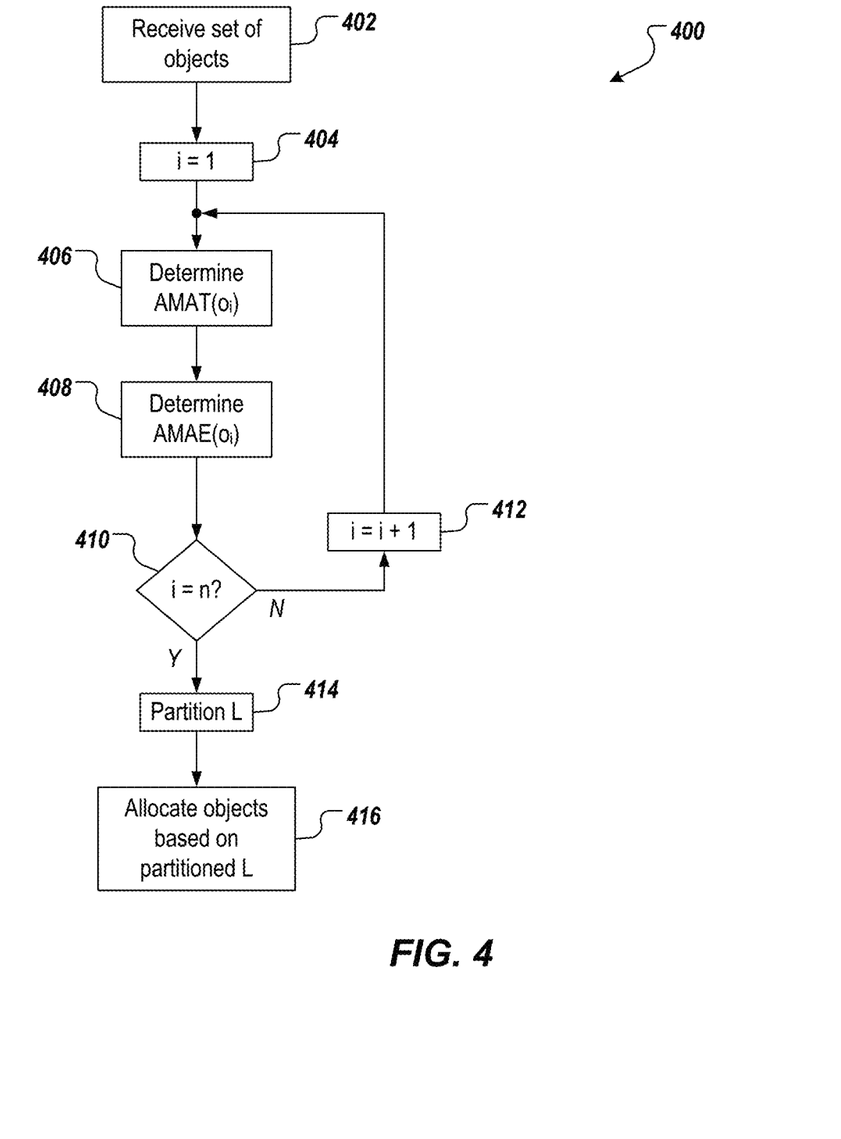
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs executed using one or more computing devices. In some implementations, the example process 400 is performed for static placement of objects.

A list of objects is received (402). In some examples, the list of objects includes objects (e.g., $o_1, \ldots, o_n$) that are to be allocated to memory of a hybrid memory system during execution of an application. A counter i is set equal to 1 (404). AMAT($o_i$) is determined for object $o_i$ (406). AMAE ($o_1$) is determined for object $o_i$ (408). It is determined whether i is equal to n (410). In other words, it is determined whether all objects in the list of objects have been considered. If i is not equal to n, the counter i is incremented (412), and the example process 400 loops back. If i is equal to n, the list of objects is partitioned (414). For example, the list of objects is partitioned as described in detail herein. Objects in the list of objects are allocated to respective memory types based on the partitioned list (416). For example, static allocation of objects is performed to allocate objects as described herein.

Implementations of the present disclosure also provide for dynamic page migration in hybrid memory systems. In some implementations, static placement of data in hybrid memory systems can occur as discussed herein, and/or as discussed in commonly assigned, U.S. Ser. No. 14/704,461, filed on May 5, 2015, and entitled Managed Energy-Efficient Hybrid Main Memory Systems, the disclosure of which is expressly incorporated herein by reference in the entirety for all purposes. As discussed in U.S. Ser. No. 14/704,461, application source code is instrumented with a profiling tool that profiles all of the allocations made by the application during the execution phase. In some examples, the profiling tool collects statistics including memory loads, memory stores, off-chip memory accesses, memory allocations, allocation sizes, callpath and lifetime. In some examples, a callpath of an object is the source code locations within the application where the object is first allocated, initialized and accessed during the execution of the application. In some examples, the lifetime of an object is the time between allocation and de-allocation of the object.

In some examples, the statistics are provided in a statistics file. In some examples, the performance model and energy model, as described herein, and/or in U.S. Ser. No. 14/704,461 are used to determine data placement for each object of an application. In the examples of U.S. Ser. No. 14/704,461, the programmer can change the executable of the application to place objects on DRAM or NVM according to the performance and energy models.

As introduced above, implementations of the present disclosure provide dynamic OS page migration for hybrid memory systems. As discussed in further detail herein, implementations of the present disclosure use both offline object placement (e.g., as described above, and in U.S. Ser. No. 14/704,461), and online object placement (e.g., dynamic OS page migration, as described herein) to achieve energy savings with minimal performance degradation. For example, implementations of the present disclosure have been tested for an in-memory database running an analytical workload. More specifically, the analytical workload included benchmark queries provided in the TPC Benchmark H (TPC-H) provided by the Transaction Processing Performance Council of San Francisco, Calif. The TPC-H is a decision support benchmark that includes a set of business oriented ad-hoc queries (e.g., a set of benchmark queries), and concurrent data modifications. An energy savings of up to 57% with a performance degradation of up to 3% was observed (relative to a DRAM-only memory system).

In accordance with implementations of the present disclosure, for each page requested by an application, the page is initially placed in NVM. That is, NVM is provided as a default placement for pages. In some examples, if static placement of a particular data object provides for placement of the data object on DRAM, the object will instead be placed on DRAM.

In some implementations, each time a page is accessed (subsequent to the page's initial placement in NVM), energy costs for storage of the page on DRAM and NVM are respectively determined, and a page migration decision is made based on the energy costs. More particularly, for a page p, respective energy costs $C_{DRAM}$ and $C_{NVM}$ can be determined based on the following example relationship:

$$C_\tau(p) = \mu_r(o) E_{\tau,r} + \mu_w(o) E_\tau \quad (5)$$

where $\tau$ is either DRAM or NVM, $E_{\tau,r}$ and $E_{\tau,w}$ are the energy for reading and writing, respectively, to or from memory type $\tau$, and the parameters $\mu_r(o)$ and $\mu_w(o)$ represent the read access and write accesses to the page in memory. In some examples, if $C_{NVM}$ is greater than $C_{DRAM}$ and the page p is located in NVM, the page is migrated to DRAM. In some examples, if $C_{NVM}$ is not greater than $C_{DRAM}$ and the page p is located in DRAM, the page is migrated to NVM. In some examples, the OS performs the page migration. In some examples, during page migration, the contents of the page are copied over to the other memory (e.g., from NVM to DRAM) using memcpy, and is deleted from the original memory (e.g., deleted from NVM).

Figure 5:
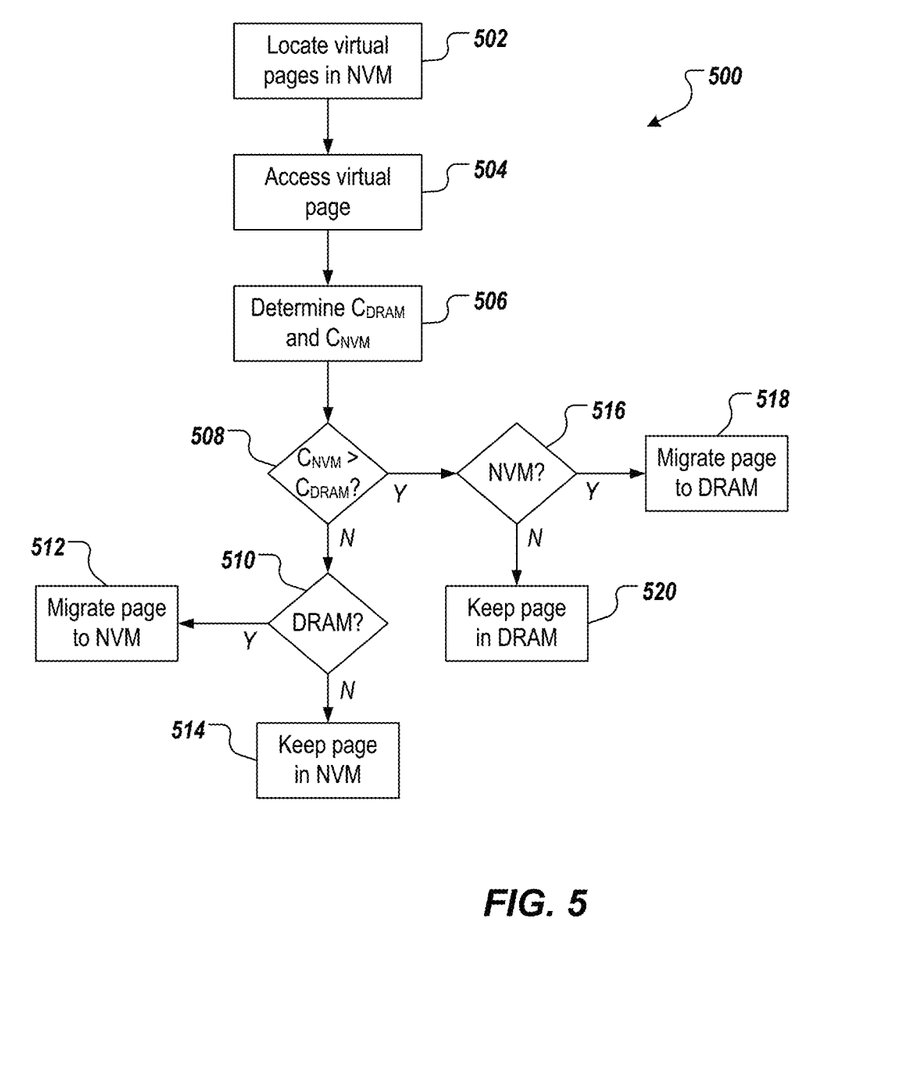
FIG. 5 depicts an example process that can be executed in accordance with implementations of the present disclosure.

FIG. 5 depicts an example process 500 that can be executed in accordance with implementations of the present disclosure. In some implementations, the example process 500 can be realized using one or more computer-executable programs executed using one or more computing devices.

Pages are stored in NVM (502). For example, during execution of an application using a hybrid memory system, virtual memory pages are initially stored in NVM (e.g., NVM is a default). A page is accessed (504). For example, during execution of the application, an already stored page is accessed (e.g., read from, written to). $C_{RAM}$ and $C_{NVM}$ are determined for the page (506). For example, $C_{RAM}$ and $C_{NVM}$ are determined based on Equation 5 above.

It is determined whether $C_{NVM}$ is greater than $C_{RAM}$ (508). If $C_{NVM}$ is not greater than $C_{RAM}$, it is determined whether the page is currently stored in DRAM (510). If the page is stored in DRAM, the page is migrated to NVM (512). If the page is not stored in DRAM, the page is maintained in NVM (514). If $C_{NVM}$ is greater than $C_{RAM}$, it is determined whether the page is currently stored in NVM (516). If the page is stored in NVM, the page is migrated to DRAM (518). If the page is not stored in NVM, the page is maintained in DRAM (520).

Figure 6:
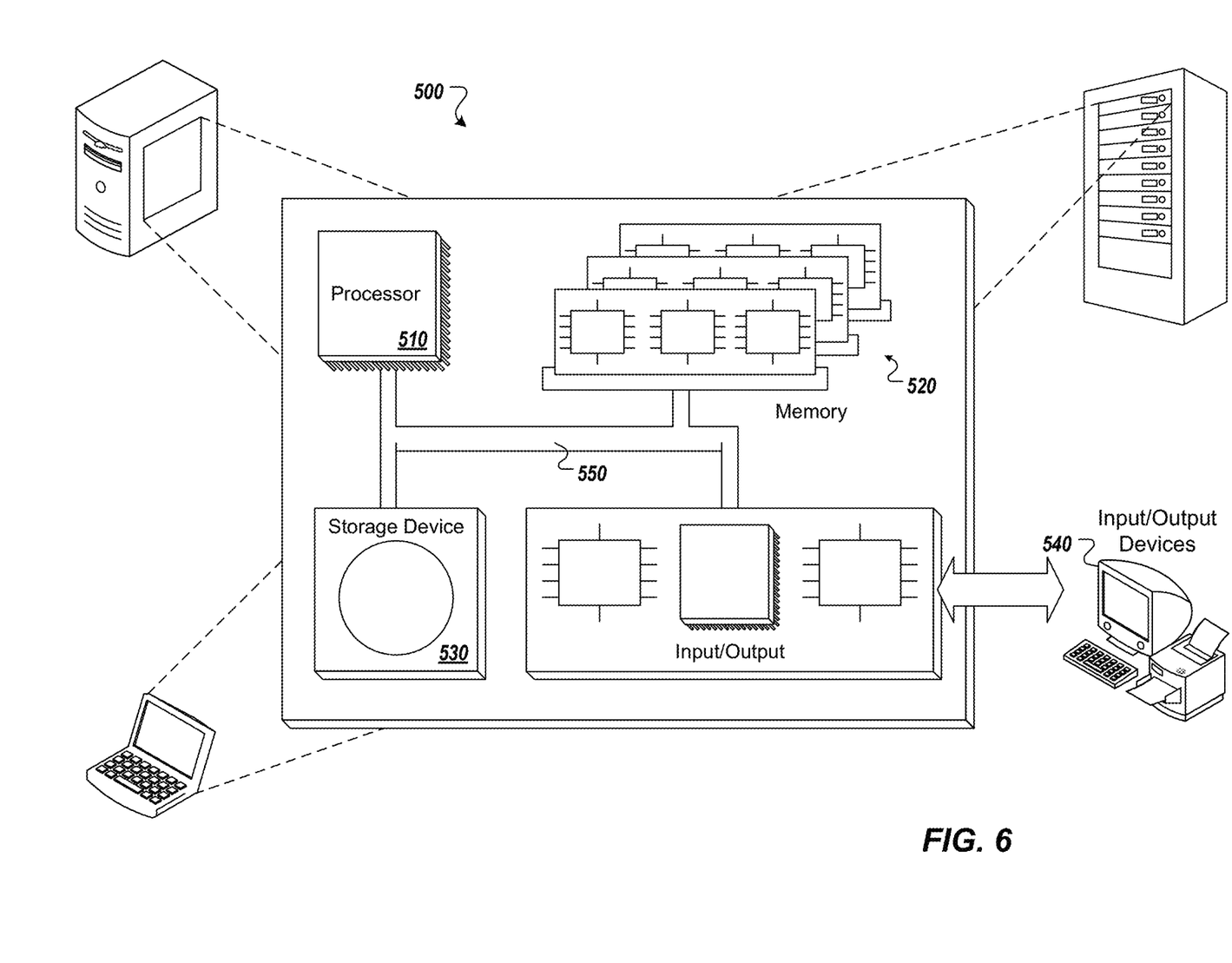
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both.

Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
    storing, by one or more cores of a central processing unit (CPU), an object in an initial location based on a memory allocation function of a plurality of memory allocation functions of an application, a first memory allocation function being directed to a first memory type and a second memory allocation function being directed to a second memory type for storing the object in a hybrid memory system;
    determining, by the one or more cores of the CPU, a first cost and a second cost associated with a virtual memory page accessed during execution of an application, the first cost being calculated for the first memory type based on costs for reading and writing the virtual memory page to and from the first memory type, if the virtual page were stored in the first memory type, and the second cost being calculated for the second memory type based on costs for reading and writing the virtual memory page to and from the second memory type, if the virtual page were stored in the second memory type;
    comparing, by the one or more cores of the CPU, the first cost and the second cost to provide a comparison result;
    determining, by the one or more cores of the CPU, a current location of the virtual memory page, the current location comprising one of the first memory type and the second memory type; and
    selectively migrating, by the one or more cores of the CPU, the virtual memory page from the current location based on the comparison result and the current location.

2. The method of claim 1, wherein each of the first cost and the second cost is determined based on a read energy and a write energy expended for the virtual memory page with respect to the first memory type and the second memory type, respectively.

3. The method of claim 1, wherein selectively migrating the virtual memory page comprises migrating the virtual memory page from the second memory type to the first memory type in response to determining that the second cost exceeds the first cost, and that the virtual memory page is stored in the second memory type.

4. The method of claim 1, wherein selectively migrating the virtual memory page comprises migrating the virtual memory page from the first memory type to the second memory type in response to determining that the second cost does not exceed the first cost, and that the virtual memory page is stored in the first memory type.

5. The method of claim 1, wherein migrating the virtual memory page comprises copying the virtual memory page from one of the first memory type and the second memory type to the other of the first memory type and the second memory type, and deleting the virtual memory page from the one of the first memory type and the second memory type.

6. The method of claim 1, wherein determining the first cost and the second cost is performed in response to the virtual memory page being accessed.

7. The method of claim 1, wherein the first memory type comprises dynamic random access memory (DRAM), and the second memory type comprises non-volatile memory (NVM).

8. A non-transitory computer-readable storage medium coupled to one or more processors and having instructions stored thereon which, when executed by the one or more processors, cause the one or more processors to perform operations comprising:
    storing, by one or more cores of a central processing unit (CPU), an object in an initial location based on a memory allocation function of a plurality of memory allocation functions of an application, a first memory allocation function being directed to a first memory type and a second memory allocation function being directed to a second memory type for storing the object in a hybrid memory system;
    determining, by the one or more cores of the CPU, a first cost and a second cost associated with a virtual memory page accessed during execution of an application, the first cost being calculated for the first memory type based on costs for reading and writing the virtual memory page to and from the first memory type, if the virtual page were stored in the first memory type, and the second cost being calculated for the second memory type based on costs for reading and writing the virtual memory page to and from the second memory type, if the virtual page were stored in the second memory type;

comparing the first cost and the second cost to provide a comparison result;

determining, by the one or more cores of the CPU, a current location of the virtual memory page, the current location comprising one of the first memory type and the second memory type; and selectively migrating, by the one or more cores of the CPU, the virtual memory page from the current location based on the comparison result and the current location.

9. The computer-readable storage medium of claim 8, wherein each of the first cost and the second cost is determined based on a read energy and a write energy expended for the virtual memory page with respect to the first memory type and the second memory type, respectively.

10. The computer-readable storage medium of claim 8, wherein selectively migrating the virtual memory page comprises migrating the virtual memory page from the second memory type to the first memory type in response to determining that the second cost exceeds the first cost, and that the virtual memory page is stored in the second memory type.

11. The computer-readable storage medium of claim 8, wherein selectively migrating the virtual memory page comprises migrating the virtual memory page from the first memory type to the second memory type in response to determining that the second cost does not exceed the first cost, and that the virtual memory page is stored in the first memory type.

12. The computer-readable storage medium of claim 8, wherein migrating the virtual memory page comprises copying the virtual memory page from one of the first memory type and the second memory type to the other of the first memory type and the second memory type, and deleting the virtual memory page from the one of the first memory type and the second memory type.

13. The computer-readable storage medium of claim 8, wherein determining the first cost and the second cost is performed in response to the virtual memory page being accessed.

14. The computer-readable storage medium of claim 8, wherein the first memory type comprises dynamic random access memory (DRAM), and the second memory type comprises non-volatile memory (NVM).

15. A system, comprising:
a computing device; and
a computer-readable storage device coupled to the computing device and having instructions stored thereon which, when executed by the computing device, cause the computing device to perform operations comprising:

storing, by one or more cores of a central processing unit (CPU), an object in an initial location based on a memory allocation function of a plurality of memory allocation functions of an application, a first memory allocation function being directed to a first memory type and a second memory allocation function being directed to a second memory type for storing the object in a hybrid memory system;

determining, by the one or more cores of the CPU, a first cost and a second cost associated with a virtual memory page accessed during execution of an application, the first cost being calculated for the first memory type based on costs for reading and writing the virtual memory page to and from the first memory type, if the virtual page were stored in the first memory type, and the second cost being calculated for the second memory type based on costs for reading and writing the virtual memory page to and from the second memory type, if the virtual page were stored in the second memory type;

comparing, by one or more cores of the CPU, the first cost and the second cost to provide a comparison result;

determining, by one or more cores of the CPU, a current location of the virtual memory page, the current location comprising one of the first memory type and the second memory type; and selectively, by one or more cores of the CPU, migrating the virtual memory page from the current location based on the comparison result and the current location.

16. The system of claim 15, wherein each of the first cost and the second cost is determined based on a read energy and a write energy expended for the virtual memory page with respect to the first memory type and the second memory type, respectively.

17. The system of claim 15, wherein selectively migrating the virtual memory page comprises migrating the virtual memory page from the second memory type to the first memory type in response to determining that the second cost exceeds the first cost, and that the virtual memory page is stored in the second memory type.

18. The system of claim 15, wherein selectively migrating the virtual memory page comprises migrating the virtual memory page from the first memory type to the second memory type in response to determining that the second cost does not exceed the first cost, and that the virtual memory page is stored in the first memory type.

19. The system of claim 15, wherein migrating the virtual memory page comprises copying the virtual memory page from one of the first memory type and the second memory type to the other of the first memory type and the second memory type, and deleting the virtual memory page from the one of the first memory type and the second memory type.

20. The system of claim 15, wherein determining the first cost and the second cost is performed in response to the virtual memory page being accessed.

* * * * *